July 25, 1950  J. M. BARTHOLOMEW  2,516,291
COMPRESSOR CONTROL SYSTEM
Filed Oct. 10, 1944
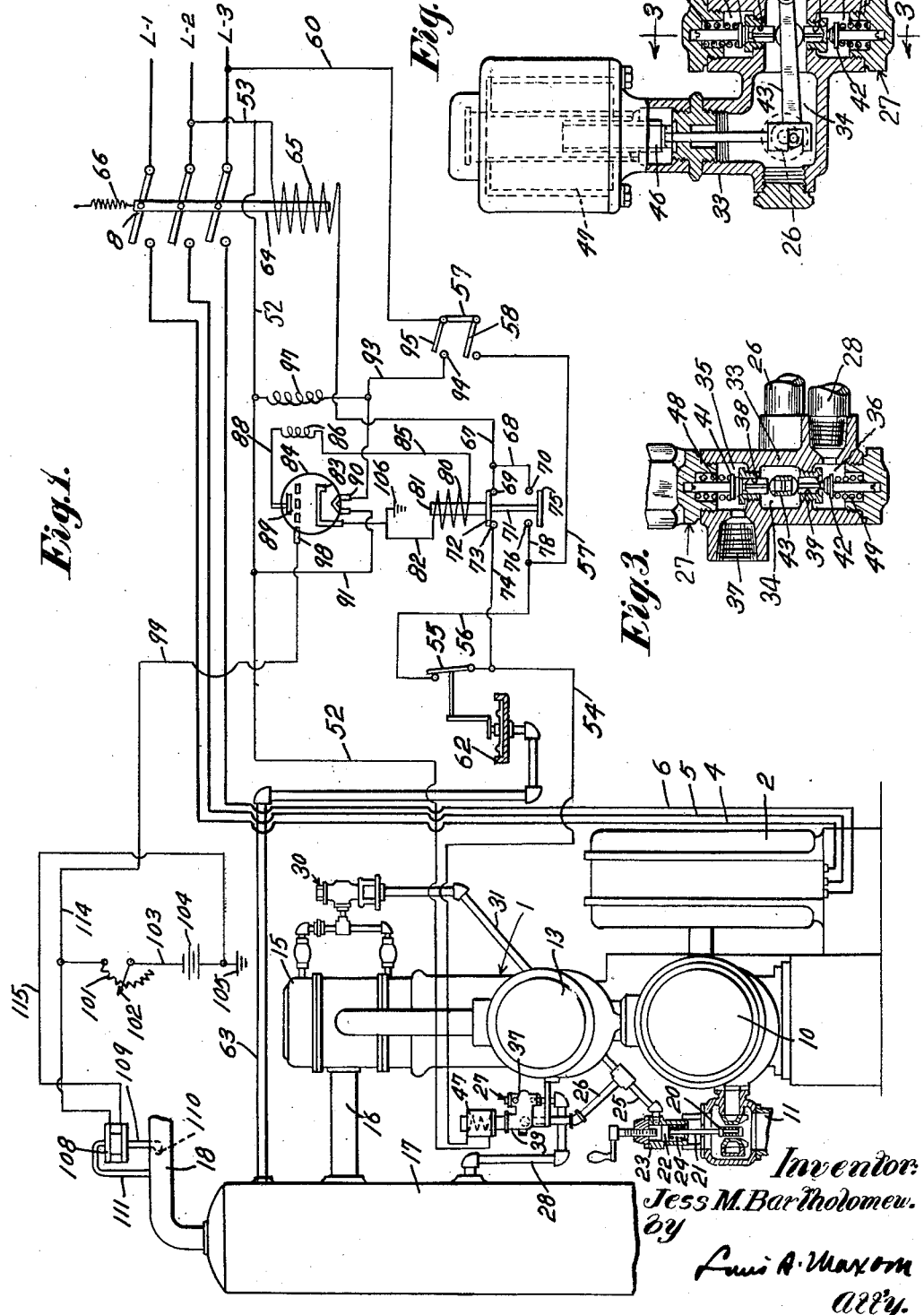
Inventor:
Jess M. Bartholomew.
By
Louis A. Maxom
att'y.

Patented July 25, 1950

2,516,291

UNITED STATES PATENT OFFICE 2,516,291

COMPRESSOR CONTROL SYSTEM

Jess M. Bartholomew, Michigan City, Ind., assignor to Joy Manufacturing Company, a corporation of Pennsylvania Application October 10, 1944, Serial No. 558,046

24 Claims. (Cl. 230—4)

My invention relates to control systems, and more particularly to control systems which operate automatically to control the operation of a pump or compressor in accordance with the demand for fluid.

It is customary to provide the ordinary compressor unit, consisting of a fluid compressor driven by a variable speed motor, with means for unloading the compressor and slowing down the motor to an idling speed when a predetermined maximum pressure is reached in a receiver. The compressor then operates in this manner until the receiver pressure drops to a predetermined low value at which time the compressor is reloaded and the driving motor is accelerated to its maximum speed. If a constant speed motor, such as an electric motor, is used, it is customary to stop the motor when unloading takes place, and to restart the motor shortly before reloading. When the demand for pressure fluid is not sufficient to prevent unloading of the compressor but is sufficient to require reloading shortly after the compressor has been unloaded, it is desirable that the motor be maintained in operation during the time the compressor is unloaded since frequent stopping and starting of the compressor results in a decreased efficiency. If the demand for pressure fluid is such that a considerable period of time may elapse between unloading and reloading, the motor should be stopped to maintain the highest efficiency.

My invention contemplates the provision of a control system for a compressor driven by a constant speed motor, the control system operating to unload the compressor and to stop the motor at a maximum receiver pressure when the demand for pressure fluid is low. If the demand for pressure fluid continues to remain low while the compressor is unloaded, the motor will be stopped until a predetermined low pressure exists in the receiver. If the demand for pressure fluid is high when the maximum pressure is reached, the compressor will be unloaded but its driving motor will be kept operating. If the demand for fluid becomes high when the compressor is unloaded and the motor is stopped, the control system will operate to effect an immediate starting of the motor but the compressor will remain unloaded until the low receiver pressure is reached. As soon as the low receiver pressure is reached, the motor will be started if it is not already running and then the compressor will be reloaded.

According to a preferred form of my invention, there is provided a control system having an electrical circuit including the winding of a solenoid for an unloading control valve and a switch which is responsive to the pressures in the receiver. When the pressure switch is closed, the solenoid is energized so that the unloadng control valve is held in a position to effect loading of the compressor. As soon as the pressure switch opens and deenergizes the solenoid, the compressor is unloaded. A branched electrical circuit is also provided, this circuit including the winding of a solenoid which controls a switch between the power line and the motor, and a control switch having two contactors, one controlling the connection of the second solenoid winding to a branch of the circuit which leads directly to the power line, and the other contactor controlling the connection of the second solenoid winding through the pressure responsive switch to the power line. When one contactor of the control switch is closed the other is in an open position. The position of the control switch is determined by a solenoid having its winding connected in a circuit leading to the cathode and anode of an electronic tube, and the flow of current in this circuit is determined by the voltage on the grid of the tube. In order to control the grid voltage, there is provided a circuit including a device which varies in resistance in accordance with the flow of fluid from the receiver to a point of use. This device is connected in series with another resistance across a battery, and the grid circuit is connected in parallel with the device. As the flow of fluid from the receiver increases, the resistance of the device decreases and the potential of the grid is reduced. A reduced grid voltage causes current to flow in the circuit including the solenoid of the control switch so that the latter is moved to a position connecting the solenoid winding of the line switch directly to the power line. When the flow of fluid from the receiver decreases, the resistance of the device increases causing the grid potential to increase and cut off the flow of current through the circuit including the solenoid of the control switch. This results in a movement of the control switch to a position connecting the solenoid winding of the line switch through the pressure responsive switch to the power line. Instead of using a device which varies in resistance in accordance with the flow of fluid from the receiver, there may be used a switch which opens and closes respectively at predetermined low and high rates of fluid flow.

An object of my invention is to provide an improved control system for a pump or compressor. Another object of my invention is to provide an improved control system which functions to control the operation of a compressor in accordance with the demand for pressure fluid. Still another object is to provide for a compressor an improved control system which operates to unload the compressor and to stop its driving motor when the discharge pressure reaches a maximum value and the demand for pressure fluid is low, and to unload the compressor and maintain operation of the driving motor at the maximum value when the demand for fluid is high. Yet another object is to provide an improved control system which is operative to effect a starting or a continued operation of a driving motor for a compressor when the demand for pressure fluid is high, and to effect a stopping and starting of the driving motor at high and low discharge pressure when the demand for pressure fluid is low. These and other objects of the invention will be pointed out in the following description.

In the accompanying drawing there is shown for purposes of illustration one form which the invention may assume in practice.

In this drawing:

Fig. 1 is a schematic diagram showing my improved control system connected to the compressor for controlling its operation.

Fig. 2 is an enlarged sectional view of the unloading control means for the compressor, parts being shown in full to facilitate illustration.

Fig. 3 is a cross sectional view taken on the plane of the line 3—3 of Fig. 2.

There is shown in the drawing a compressor, generally designated 1, driven by an electric motor 2 which is supplied with current by conductors 4, 5 and 6 connected through a line switch 8 with the conductors L—1, L—2 and L—3 of a power line. The compressor is shown herein as including a low pressure cylinder 10 receiving fluid from an intake conduit 11. The fluid is compressed in the low pressure cylinder and discharged through an intercooler 13 to a high pressure cylinder 15 where it is compressed further and discharged through a conduit 16 to a receiver 17. Leading from the receiver 17 is a conduit 18 through which pressure fluid is supplied to a point of use.

The supply of fluid through the intake conduit 11 to the low pressure cylinder is controlled by an intake closure valve 20 which is connected by a valve stem 21 to a piston 22 reciprocably contained within a cylinder 23. A spring 24 acts on the lower end of the piston for urging the valve 20 toward its open position. A pipe 25 is connected in communication with the cylinder 23 at the upper side of the piston 22, and communicates through a pipe 26 and an unloading control valve, generally designated 27, with a pipe 28 opening into the receiver 17. The high pressure cylinder is provided with suitable venting means, generally designated 30, and shown herein as being like that disclosed in the W. E. Hughes patent, No. 1,786,114, granted December 23, 1930. A pipe 31 communicates with the venting means 30 and is connected in communication with the receiver through the pipe 26, the control valve 27, and the pipe 28.

The valve 27 is shown herein as including a casing 33 having a chamber 34 into which the pipe 26 opens. At opposite sides of the chamber 34 are chambers 35 and 36 connected respectively in communication with the atmosphere through a port 37 and with the receiver through the pipe 28. The chambers 35 and 36 communicate with the chamber 34 through ports 38 and 39, respectively, which are normally closed by spring pressed valves 41 and 42. A lever 43 is pivoted at one end 45 within the chamber 34 and is suitably connected at its other end to a plunger 46 projecting within a solenoid winding 47. The valves 41 and 42 have stem portions engaging opposite sides of the lever 43 so that the valves may be unseated against the action of springs 48 and 49 when the lever is swung about its pivotal mounting. When the winding 47 is energized, the lever 43 is swung upwardly unseating the valve 41 and connecting the pipe 26 to atmosphere through the chamber 34, the port 38, the chamber 35 and the port 37. The connection of pipe 26 to atmosphere causes fluid to be vented from the piston 22 for the intake closure valve and from the venting means 30 for the high pressure cylinder, and the compressor is loaded. When the winding 47 is deenergized, the plunger 46 drops and swings the lever 43 in a direction to unseat the valve 42 and connect the pipe 26 in communication with the receiver through the chamber 34, the port 39, the chamber 36, and the pipe 28. Fluid then flows from the pipe 26 to the pipes 25 and 31 to effect a closing of the intake closure valve 20 and a venting of the high pressure cylinder for unloading the compressor.

The solenoid winding 47 is connected at one end by conductors 52 and 53 to the conductor L—2 of the power line, and is connected at its other end by a conductor 54, a switch element 55, conductors 56 and 57, a contactor 58 of a manually operated switch 59, and a conductor 60 to the conductor L—3 of the power line. The manually operated switch 59 is left closed during operation of the compressor, and the switch element 55 is operatively connected to a pressure responsive device 62 which is connected by a pipe 63 to the receiver. When the receiver pressure reaches a predetermined maximum value, the device 62 operates to open the switch element 55, breaking the circuit to deenergize the solenoid winding 47 and effect an unloading of the compressor. At a predetermined lower pressure in the receiver, the device 62 operates to close the switch element 55 for completing the circuit including the winding 47 and causing a reloading of the compressor.

The line switch 8 has a plunger portion 64 extending into a coil 65 which operates when energized to close the switch against the action of a spring 66. One end of the coil 65 is connected to the power line L—2 through the conductor 53, and the other end of the coil is connected by conductors 67 and 68 to terminals 69 and 70 of a control switch 71. The terminal 69 is adapted to be connected by a contactor 72 of the control switch to a terminal 73 which is connected by a conductor 74 to the conductor 54. The terminal 70 is adapted to be connected by a contactor 75 of the control switch to a terminal 76 which is connected by a conductor 78 to the conductor 57. The contactors 72 and 75 are so arranged that only one pair of terminals can be connected together at a time.

When the terminals 69 and 73 are connected by the contactor 72, a circuit is completed from the power line L—2 through the conductor 53, the coil 65, the conductor 67, the contactor 72, the conductors 74 and 54, the switch element 55, the conductors 56 and 57, the contactor 58 of the switch 59 and the conductor 60 to the power line L—3. It will be seen that an opening of the switch element 55 under these conditions causes a deenergizing of the coil 65 as well as a deenergizing of the coil 47 so that the line switch 8 is opened as the compressor is unloaded. When the terminals 70 and 76 are connected by the contactor 75, a circuit is completed from the power line L—2 through the conductor 53, the coil 65, the conductors 67 and 68, the contactor 75, the conductors 78 and 57, the contactor 58 of the switch 59 and the conductor 60 to the power line L—3. As long as this circuit is maintained the coil 65 is energized and the line switch 8 is held in its closed position.

The position of the control switch 71 is regulated by a coil 80 surrounding a plunger portion 81 connected to the switch. One end of the coil 80 is connected by a conductor 82 to the cathode 83 of an electronic tube 84, herein shown as of the thermionic type. The other end of the coil 80 is connected by a conductor 85 to one end of a secondary winding 86 of a transformer, and the other end of the secondary winding is connected by a conductor 88 to the anode 89 of the electronic tube. A heating element 90 of the electronic tube is connected at one end by a conductor 91 to the conductor 52 and is connected at its other end by a conductor 93 to a terminal 94 of the manually operated switch 59. A contactor 95 on the switch 59 is adapted to connect the terminal 94 to the conductor 60 leading to the power line L—3. The primary winding 97 of the transformer is connected at opposite ends to the conductors 52 and 93. When the contactor 95 of the switch 59 is closed, current flows continuously from the power line L—2 through conductors 53, 52 and 91, the heating element 90, the conductor 93, the contactor 95 and the conductor 60 to the power line L—3. Current also flows continuously from the power line L—2 through conductors 53 and 52, the primary winding 97 of the transformer, the conductor 93, the contactor 95 and the conductor 60 to the power line L—3. The heating element 90 of the electronic tube is heated by the current passing through it and causes the cathode to be heated so as to emit electrons which pass to the anode 89 completing the circuit across the secondary winding 86 of the transformer so that current flows through the coil 80 and effects movement of the control switch 71 into a position connecting the terminals 70 and 76 by the contactor 75. Arranged between the cathode and anode of the electronic tube is a grid 98 which regulates the flow of electrons. The grid 98 is connected by a conductor 99 to one end of a variable resistance 101. A contactor 102 of the variable resistance is connected by a conductor 103 to one side of a battery 104 which is connected at its other side to ground, as at 105. The circuit including the cathode and anode of the electronic tube is grounded at 106 so as to complete the grid circuit.

Arranged adjacent the conduit 18 leading from the receiver 17 is a device 109 which varies in resistance in accordance with pressures to which it is subjected. This device is shown herein as a carbon pile and is connected at one side by a conduit 109 to a point within the conduit 18. The conduit 109 is provided with a portion 110 which is directed against the flow of fluid in the conduit 18. The other side of the carbon pile is connected by a conduit 111 which opens into the conduit 18 at a point in its inner surface. It will be seen that the lower side of the carbon pile is subjected to a pressure varying with the rate of flow of fluid in the conduit 18, and the upper side of the carbon pile is subjected to the static pressure in the conduit 18. As the flow of fluid increases, the pressure differential on the carbon pile increases causing a reduction in its resistance. One side of the carbon pile is connected by a conductor 114 to the variable resistance 101. The other end of the carbon pile is connected by a conductor 115 to the grounded side of the battery 104. Instead of using a carbon pile, it is obvious that there may be used a switch which is closed at a predetermined maximum rate of fluid flow in the conduit 18 and is opened when the flow of fluid drops below a predetermined minimum.

The operation of the mechanism described is as follows: Assuming that the flow of fluid in the conduit 18 is such that the differential pressure acting on the carbon pile is low, the resistance of the latter will be comparatively high. This will result in a reduced flow of current from the battery 104 through the variable resistance 101, the conductor 114, the carbon pile 108 and the conductor 115 to the grounded side of the battery. The voltage drop across the variable resistance 101 will be low, and the voltage drop across the carbon pile 108 will be comparatively high. Since the grid circuit of the electronic tube is connected across the carbon pile, the potential of the grid will be high and will oppose the flow of electrons from the cathode 83 to the anode 89. If the flow of electrons from the cathode to the anode of the electronic tube is such that the flow of current from the secondary winding of the transformer through the coil 80 is insufficient to hold the control switch in its raised position, this switch will then drop to a position connecting the terminals 69 and 73 by the contactor 72. This will result in a connection of the coil 65 for the line switch 8 in the circuit including the switch element 55 so that an increase in receiver pressure to the value which operates the pressure responsive device 62 to open the switch element 55 will effect an unloading of the compressor and also an opening of the line switch 8 to stop the motor 2. As the flow of fluid in the conduit 18 increases, the differential pressure acting on the carbon pile also increases, causing the resistance of the latter to decrease. As the resistance of the carbon pile decreases, the flow of current from the battery 104 through the resistance 101 and through the carbon pile to the other side of the battery increases, resulting in a reduction in the grid potential. When the grid potential drops to such a value that the flow of the electrons between the cathode and anode is increased to a point where the current in the circuit including the coil 80 is sufficient to raise the control switch 71, the terminals 70 and 76 will be connected by the contactor 75 completing the circuit which connects the coil 65 of the line switch directly to the power line L—3. Under these conditions, the line switch will be maintained closed and an opening of the switch element 55 will result only in an unloading of the compressor.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, and means responsive to the flow of compressed fluid to a point of use for controlling said control switch.

2. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the control circuit branch including said pressure responsive switch, and means responsive to the flow of compressed fluid to a point of use for effecting movement of said control switch to a position for connecting said coil to the control circuit branch leading directly to the power line.

3. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, a solenoid for controlling said control switch, said last mentioned solenoid operative when energized to position said control switch for connecting said coil to the circuit branch leading directly to the power line, and means responsive to the flow of compressed fluid to a point of use for controlling the energizing of said last mentioned solenoid.

4. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the circuit branch including said pressure responsive switch, a solenoid for controlling said control switch, said last mentioned solenoid operative when energized to position said control switch for connecting said coil to the circuit branch leading directly to the power line, and means responsive to the flow of compressed fluid to a point of use for controlling the energizing of said last mentioned solenoid.

5. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the circuit branch including said pressure responsive switch, a solenoid for controlling said control switch, said last mentioned solenoid operative when energized to position said control switch for connecting said coil to the circuit branch leading directly to the power line, means for controlling the energizing of said last mentioned solenoid, said controlling means including an electronic tube having its cathode and anode connected in a circuit including said last mentioned solenoid, a grid for said electronic tube, and means for controlling the potential of said grid in accordance with the flow of compressed fluid to a point of use.

6. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the circuit branch including said pressure responsive switch, a solenoid for controlling said control switch, said last mentioned solenoid operative when energized to position said control switch for connecting said coil to the circuit branch leading directly to the power line, means for controlling the energizing of said last mentioned solenoid, said controlling means including an electronic tube having its cathode and anode connected in a circuit including said last mentioned solenoid, a grid for said electronic tube, and means for controlling the potential of said grid, said last mentioned means including a circuit containing a device which varies in resistance in accordance with the flow of compressed fluid to a point of use.

7. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the circuit branch including said pressure responsive switch, a solenoid for controlling said control switch, said last mentioned solenoid operative when energized to position said control switch for connecting said coil to the circuit branch leading directly to the power line, means for controlling the energizing of said last mentioned solenoid, said controlling means including an electronic tube having its cathode and anode connected in a circuit including said last mentioned solenoid, a grid for said electronic tube, and means for controlling the potential of said grid, said last mentioned means including a device varying in resistance in accordance with the flow of compressed fluid to a point of use and a circuit connecting said grid and said device in parallel across a resistance and a power unit connected in series.

8. A control system for an electric motor driven compressor comprising, in combination, unloading means for the compressor, a solenoid which is operative when energized to effect loading, a control circuit for said solenoid, said control circuit including a switch responsive to compressor discharge pressure, a motor circuit, a line switch for controlling the supply of electric current to said motor circuit, means including a coil which is operative when energized to effect closure of said line switch, a branched control circuit for said coil, one branch connecting said coil directly to a power line and another branch connecting said coil through said pressure responsive switch to a power line, a control switch for connecting said coil to one branch or another of said branched circuit, said control switch normally operative to connect said coil to the circuit branch including said pressure responsive switch, a solenoid for controlling said control switch, said last mentioned solenoid operative when energized to position said control switch for connecting said coil to the circuit branch leading directly to the power line, means for controlling the energizing of said last mentioned solenoid, said controlling means including an electronic tube having its cathode and anode connected in a circuit including said last mentioned solenoid, a grid for said electronic tube, and means for controlling the potential of said grid, said last mentioned means including a device varying in resistance in inverse proportion to the rate of flow of compressed fluid to a point of use and a circuit connecting said grid and said device in parallel across a resistance and a power unit connected in series.

9. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, and including a device responsive to the flow of compressed fluid to a point of use for controlling said control switch.

10. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, and means governed by the rate of flow of compressed fluid to a point of use for controlling said control switch to effect connection of said coil in said circuit which connects said coil directly to said power line when the rate of compressed fluid use equals or exceeds a predetermined value.

11. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, a solenoid for controlling said control switch, said solenoid operative when energized to position said control switch for connecting said coil to the control circuit leading directly to the power line, and means responsive to the flow of compressed fluid to a point of use for controlling the energizing of said solenoid.

12. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, said control switch normally operative to connect said coil to the one of said control circuits including said pressure responsive switch, a solenoid for controlling said control switch, said solenoid operative when energized to position said control switch for connecting said coil to the one of said control circuits leading directly to the power line, and means responsive to the flow of compressed fluid to a point of use for controlling the energizing of said solenoid.

13. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, said control switch normally operative to connect said coil to the one of said control circuits including said pressure responsive switch, a solenoid for controlling said control switch, said solenoid operative when energized to position said control switch for connecting said coil to the one of said control circuits leading directly to the power line, means for controlling the energizing of said solenoid, said controlling means including an electronic tube having its cathode and anode connected in a circuit including said solenoid, a grid for said electronic tube, and means for controlling the potential of said grid in accordance with the flow of compressed fluid to a point of use.

14. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, said control switch normally operative to connect said coil to the one of said control circuits including said pressure responsive switch, a solenoid for controlling said control switch, said solenoid operative when energized to position said control switch for connecting said coil to the one of said control circuits leading directly to the power line, means for controlling the energizing of said solenoid, said controlling means including an electronic tube having its cathode and anode connected in a circuit including said solenoid, a grid for said electronic tube, and means for controlling the potential of said grid, said last mentioned means including a circuit containing a device which varies in resistance in accordance with the flow of compressed fluid to a point of use.

15. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, said control switch normally operative to connect said coil to the one of said control circuits including said pressure responsive switch, a solenoid for controlling said control switch, said solenoid operative when energized to position said control switch for connecting said coil to the one of said control circuits leading directly to the power line, means for controlling the energizing of said solenoid, said controlling means including an electronic tube having its cathode and anode connected in a circuit including said solenoid, a grid for said electronic tube, and means for controlling the potential of said grid, said last mentioned means including a device varying in resistance in accordance with the flow of compressed fluid to a point of use and a circuit connecting said grid and said device in parallel across a resistance and a power unit connected in series.

16. A control system for an electric motor driven compressor comprising, in combination, a motor circuit, a line switch for controlling the supply of current to said motor circuit, means including a coil which is operative when energized to effect a closure of said switch, control circuits for said coil, one circuit connecting said coil directly to a power line and another circuit connecting said coil through a pressure responsive switch to a power line, means for subjecting said pressure responsive switch to compressor discharge pressure, a control switch for connecting said coil in one or another of said control circuits, said control switch normally operative to connect said coil to the one of said control circuits including said pressure responsive switch, a solenoid for controlling said control switch, said solenoid operative when energized to position said control switch for connecting said coil to the one of said control circuits leading directly to the power line, means for controlling the energizing of said solenoid, said controlling means including an electronic tube having its cathode and anode connected in a circuit including said solenoid, a grid for said electronic tube, and means for controlling the potential of said grid, said last mentioned means including a device varying in resistance in inverse proportion to the rate of flow of compressed fluid to a point of use and a circuit connecting said grid and said device in parallel across a resistance and a power unit connected in series.

17. A control system for compressors including a thermionic device, means for controlling the compression of fluid, controlling means for said compression controlling means controlled by said thermionic device, and means responsive to the flow of compressed fluid to a point of use for controlling the functioning of said thermionic device.

18. A control system for compressors including means for effecting operation of a compressor on the "stop and start" system and on the "load and unload" system, means including a thermionic device for selectively rendering said control systems effective, and means governed by the rate of flow of fluid to a point of use for controlling the functioning of said thermionic device.

19. A control system for a motor circuit of a motor driven compressor comprising, in combination, a line switch for controlling the supply of current to the motor circuit, a control circuit including a solenoid for controlling said line switch, a control switch for said control circuit, a solenoid for controlling said control switch, means for controlling the energizing of said last mentioned solenoid, said controlling means including an electronic tube having its cathode and anode connected in a circuit including said last mentioned solenoid, a grid for said electronic tube, and means for controlling the potential of said grid in accordance with the flow of compressed fluid to a point of use.

20. A compressor control system including a plurality of devices for differently controlling the delivery by a compressor of compressed fluid and controlling means for said devices including an electronic tube having a cathode and an anode and a control circuit in which said cathode and anode are connected, said electronic tube having also a grid, and means responsive to the flow of compressed fluid to a point of use for controlling the potential of said grid.

21. A pump control system including a plurality of devices for controlling the pumping of fluid by a pump, a control circuit for determining which of said devices shall control the pumping of fluid by the pump, an electronic tube having a cathode and an anode connected in said control circuit, said tube also having a grid, and means responsive to the flow of pumped fluid from the pump to a point of use for controlling the potential of the grid.

22. In combination, in a compressor control system, a compressor having loading and unloading means, a driving motor for said compressor having stopping and starting means, a compressor discharge pressure responsive device, means for selectively subjecting one or both of said means to control by said compressor discharge pressure responsive means, and control means for said last recited means including a source of electrical energy, a solenoid, an electronic tube having a cathode and an anode and a grid, said cathode and anode connected with said solenoid and said source of energy in series, and means responsive to the flow of compressed fluid from said compressor to a point of use for controlling the potential of said grid.

23. In combination, in a compressor control system, a compressor having loading and unloading means, a driving motor for said compressor having stopping and starting means, a compressor discharge pressure responsive device, means for selectively subjecting said loading and unloading means or both said loading and unloading means and said stopping and starting means to control by said compressor discharge pressure responsive means, and control means for said last recited means including a source of electrical energy, a solenoid, an electronic tube having a cathode and an anode and a grid, said cathode and anode connected with said solenoid and said source of energy in series, and means responsive to the flow of compressed fluid from said compressor to a point of use for controlling the potential of said grid.

24. In combination, in a compressor control system, a compressor having loading and unloading means, a driving motor for said compressor having stopping and starting means, and means for subjecting said means to compressor discharge pressure control to effect regulation of the output of said compressor with or without stopping of said motor including an electronic tube having a cathode, an anode and a grid, a control circuit in which said cathode and anode are connected, and means responsive to the flow of compressed fluid discharged by said compressor for controlling the potential of said grid.

JESS M. BARTHOLOMEW.

REFERENCES CITED

The following references are of record in the file of this patent:

UNITED STATES PATENTS

| Number | Name | Date |
| --- | --- | --- |
| 1,786,114 | Hughes | Dec. 23, 1930 |
| 1,864,132 | Halleck | June 21, 1932 |
| 2,137,752 | Ferguson | Nov. 22, 1938 |
| 2,147,422 | Bendz | Feb. 14, 1939 |
| 2,221,855 | Bartholomew | Nov. 19, 1940 |
| 2,267,448 | Dooley | Dec. 23, 1941 |

Certificate of Correction

Patent No. 2,516,291                                               July 25, 1950

JESS M. BARTHOLOMEW

It is hereby certified that error appears in the printed specification of the above numbered patent requiring correction as follows:

Column 10, line 15, after the word "and" insert *means*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*